United States Patent Office 2,982,750
Patented May 2, 1961

2,982,750

REACTION OF ROSIN ACID ADDUCTS WITH DIALKANOLAMINES

Henry A. Cyba, Chicago, and Ralph B. Thompson, Hinsdale, Ill., assignors, by mesne assignments, to Universal Oil Products Company, Des Plaines, Ill., a corporation of Delaware No Drawing. Filed Aug. 22, 1958, Ser. No. 756,520

11 Claims. (Cl. 260—26)

This application is a continuation-in-part of our copending application Serial No. 591,295, filed June 14, 1956 and relates to novel compositions of matter which are particularly useful as additives for the stabilization of organic compounds and, more particularly, for use in preventing deterioration of said organic compounds in storage, during transportation or in use.

The novel additives of the present invention are particularly advantageous for use in the stabilization of hydrocarbon distillate and serves to improve the hydrocarbon distillate in a number of different ways. For example, in fuel oils, burner oils, range oils, diesel oils, marine oils, turbine oils, cutting oils, rolling oils, soluble oils, drawing oils, slushing oils, slushing greases, lubricating oils, lubricating greases, fingerprint removers, etc., the distillate or grease is improved in one or more ways including retarding and/or preventing sediment formation, dispersion of sediment when formed, preventing and/or retarding discoloration, oxidation inhibitor, rust or corrosion inhibitor, detergent, etc. In lubricating type oils, in addition to all or some of the properties hereinbefore set forth, the additive may function as a pour point depressant, viscosity index improver, anti-foaming agent, extreme pressure additive, etc. In liquefied petroleum gases, gasoline, naphtha, aromatic solvents, kerosene, jet fuels, etc., the additive serves as a corrosion inhibitor along with one or more of the other functions mentioned above. In other organic compounds, including alcohols, ethers, aldehydes, ketones, chlorinated hydrocarbons, etc., and compositions containing them, glyceridic oils and fats, waxes, other oils and fats of animal or vegetable origin, rubber, resins, plastics, etc., the additive functions as a beneficent in one or more of the manners herein set forth or otherwise.

The invention is particularly applicable to the stabilization of hydrocarbon distillates heavier than gasoline. The hydrocarbon distillate may be cracked, straight run or mixtures thereof. Many fuel oils and particularly blends of straight run and cracked fuel oils undergo deterioration in storage, resulting in the formation of sediment, discoloration, etc. The formation of sediment is objectionable because the sediment tends to plug burner tips, injectors, etc. In diesel fuel, the deterioration tends to form varnish and sludge in the diesel engine. Discoloration of fuel oils is objectionable for various reasons, including customer's preference for light colored oils.

In handling of hydrocarbon distillates and other organic liquids, it is often necessary to transport and/or store such materials in metal containers, as in steel or other metal pipe lines, drums, tanks, etc. Since these materials often contain varying amounts of water in solution or in suspension which may separate, due to temperature changes, internal corrosion of the container by separating water almost invariably occurs to a greater or lesser degree. The water thus separated forms as a film or in minute droplets in the pipe line or on the container walls or even in small pools at the bottom of the container. This brings about ideal conditions for corrosion and consequent damage to the metal surfaces of the container, as well as the serious contamination of the hydrocarbon oil or other materials contained therein by the corrosion products.

Corrosion problems also occur, for example, in the lubrication of internal combustion engines or steam engines, including turbines and other similar machinery, in which a quantity of water is often observed as a separate phase within the lubricating system as a result of the condensation of water from the atmosphere or, in the case of internal combustion engines, as the result of dispersion or absorption in lubricating oil of water formed as a product of fuel combustion. Water in such instances corrodes the various metal parts of the machinery with which it comes into contact, the corrosion products causing further mechanical damage to bearing surfaces and the like due to their abrasive nature and catalytically promoting the chemical degradation of the lubricant. Corrosion problems also arise in the preparation, transportation and use of various coating compositions such as greases, household oils, paints, lacquer, etc., which often are applied to metal surfaces for protective purposes.

In one embodiment the present invention relates to a novel composition of matter comprising the condensation product of a dialkanolamine with the reaction product of a terpene and a compound selected from the group consisting of an alpha,beta-unsaturated polycarboxylic acid, anhydride and ester thereof.

In a specific embodiment of the present invention relates to a novel composition of matter comprising the condensation product of N-tallow-diethanolamine with the reaction product of a terpene and maleic anhydride.

The additive for use in the present invention is formed by the condensation of a dialkanolamine and particularly an N-aliphatic-dialkanolamine with a polycarboxylic acid, anhydride or ester formed by the reaction of a terpenic compound with an alpha,beta-unsaturated polycarboxylic acid, anhydride or ester thereof.

Any suitable dialkanolamine is used in accordance with the present invention. Preferably the dialkanolamine is an N-hydrocarbon substituted dialkanolamine, the hydrocarbon substituent preferably comprising an aliphatic group containing from about 6 to about 50 carbon atoms per molecule, although it may comprise an aryl or cycloalkyl group. It is particularly preferred that the N-substituted dialkanolamine contains from about 15 to about 40 carbon atoms in the substituent and that the nitrogen atom and the hydroxyl group are separated by not more than 4 carbon atoms.

A particularly preferred N-substituted dialkanolamine comprises an N-alkyl-diethanolamine. Illustrative compounds include N-hexyl-diethanolamine,
N-heptyl-diethanolamine,
N-octyl-diethanolamine,
N-nonyl-diethanolamine,
N-decyl-diethanolamine,
N-undecyl-diethanolamine,
N-dodecyl-diethanolamine,
N-tridecyl-diethanolamine,
N-tetradecyl-diethanolamine,
N-pentadecyl-diethanolamine,
N-hexadecyl-diethanolamine,
N-heptadecyl-diethanolamine,
N-octadecyl-diethanolamine,
N-nonadecyl-diethanolamine,
N-eicosyl-diethanolamine,
N-heneicosyl-diethanolamine,
N-docosyl-diethanolamine,
N-tricosyl-diethanolamine, N-tetracosyl-diethanolamine,
N-pentacosyl-diethanolamine,
N-hexacosyl-diethanolamine,
N-heptacosyl-diethanolamine,
N-octacosyl-diethanolamine,
N-nonacosyl-diethanolamine,
N-triacontyl-diethanolamine,
N-hentriacontyl-diethanolamine,
N-dotriacontyl-diethanolamine,
N-tritriacontyl-diethanolamine,
N-tetratriacontyl-diethanolamine,
N-pentatriacontyl-diethanolamine,
N-hexatriacontyl-diethanolamine,
N-heptatriacontyl-diethanolamine,
N-octatriacontyl-diethanolamine,
N-nonatriacontyl-diethanolamine,
N-tetracontyl-diethanolamine
N-hentetracontyl-diethanolamine,
N-dotetracontyl-diethanolamine,
N-tritetracontyl-diethanolamine,
N-tetratetracontyl-diethanolamine,
N-pentatetracontyl-diethanolamine,
N-hexatetracontyl-diethanolamine,
N-heptatetracontyl-diethanolamine,
N-octatetracontyl-diethanolamine,
N-nonatetracontyl-diethanolamine,
N-pentacontyl-diethanolamine, etc.

In some cases, N-alkenyl-diethanolamine may be utilized. Illustrative N-alkenyl-diethanolamines include N-hexenyl-diethanolamine,
N-heptenyl-diethanolamine,
N-octenyl-diethanolamine,
N-nonenyl-diethanolamine,
N-decenyl-diethanolamine,
N-undecenyl-diethanolamine,
N-dodecenyl-diethanolamine,
N-tridecenyl-diethanolamine,
N-tetradecenyl-diethanolamine,
N-pentadecenyl-diethanolamine,
N-hexadecenyl-diethanolamine,
N-heptadecenyl-diethanolamine,
N-octadecenyl-diethanolamine,
N-nonadecenyl-diethanolamine,
N-eicosenyl-diethanolamine, etc.

It is understood that the N-aliphatic-diethanolamines may contain aliphatic substituents attached to one or both of the carbon atoms forming the ethanol groups. These compounds may be illustrated by N-aliphatic-di-(2-hydroxypropyl)-amine,
N-aliphatic-di-(2-hydroxybutyl)-amine,
N-aliphatic-di-(2-hydroxyamyl)-amine,
N-aliphatic-di-(2-hydroxyhexyl)-amine,
N-aliphatic-di-(2-hypdroxyheptyl)-amine,
N-aliphatic-di-(2-hydroxyoctyl)-amine, etc.
N-aliphatic-bis-(1-hydroxy-2-propyl)-amine,
N-aliphatic-bis-(1-hydroxy-2-butyl)-amine,
N-aliphatic-bis-(1-hydroxy-2-amyl)-amine,
N-aliphatic-bis-(1-hydroxy-2-hexyl)-amine,
N-aliphatic-bis-(1-hydroxy-2-heptyl)-amine,
N-aliphatic-bis-(1-hydroxy-2-octyl)-amine, etc.,
N-aliphatic-bis-(2-hydroxy-3-butyl)-amine,
N-aliphatic-bis-(2-hydroxy-3-amyl)-amine,
N-aliphatic-bis-(2-hydroxy-3-hexyl)-amine,
N-aliphatic-bis-(2-hydroxy-3-heptyl)-amine,
N-aliphatic-bis-(2-hydroxy-3-octyl)-amine, etc.

It will be noted that, although named as an amine or alkanol, these compounds are diethanolamines as they contain two groups having the ethanol and amine groupings. It is understood that these specific compounds are illustrative only and that other suitable compounds containing the diethanolamine configuration may be employed.

The specific compounds hereinbefore set forth are examples of N-aliphatic-diethanolamines. Other N-aliphatic dialkanolamines include N-aliphatic-dipropanolamines, and N-aliphatic-dibutanolamines, although N-aliphatic-dipentanolamines, N-aliphatic-dihexanolamines and higher alkanolamines may be used in some cases. It is understood that these dialkanolamines may be substituted in a manner similar to that specifically described hereinbefore in connection with the discussion of the diethanolamines. Furthermore it is understood that mixtures of N-aliphatic-dialkanolamines may be employed, preferably being selected from those hereinbefore set forth. Also, it is understood that the various dialkanolamines are not necessarily equivalent.

A number of N-alkyl-diethanolamines are available commercially. For example, N-tallow-diethanolamine is available under the trade name of "Ethomeen T/12." This material is a gel at room temperature, has an average molecular weight of 354 and a specific gravity at 25°/25° C. of 0.916. The alkyl substituents contain from about 12 to 20 carbon atoms per group and mostly 16 to 18 carbon atoms. Another mixed product is available commercially under the trade name of "Ethomeen S/12" and is N-soya-diethanolamine. It is a gel at room temperature, has an average molecular weight of 367 and a specific gravity at 25°/25° C. of 0.911. The alkyl substituents contain 16–18 carbon atoms per group. Still another commercial product is "Ethomeen C/12," which is N-coco-diethanolamine and is a liquid at room temperature, has an average molecular weight of 303 and a specific gravity at 25°/25° C. of 0.874. The alkyl group contains mostly 12 carbon atoms per group, although it also contains groups having from 8 to 16 carbon atoms per group. Still another commercially available product is N-stearyl-diethanolamine, which is marketed under the trade name of "Ethomeen 18/12." This product is a solid at room temperature, has an average molecular weight of 372 and a specific gravity at 25°/25° C. of 0.959. It contains 18 carbon atoms in the alkyl substituent. It is understood that these dialkanolamines may be employed in accordance with the present invention.

As hereinbefore set forth, the N-aliphatic-dialkanolamine is reacted with a polycarboxylic acid, anhydride or ester formed by the reaction of a terpene with an alpha, beta-unsaturated polycarboxylic acid, anhydride or ester. The reaction product will comprise primarily the anhydride but the acid and/or ester also will be present. Any suitable terpenic compound may be reacted with any suitable alpha,beta-unsaturated polycarboxylic acid, anhydride or ester to form the reaction product for subsequent condensation with the polyalkanolamine. In one embodiment a terpene hydrocarbon having the formula $C_{10}H_{16}$ is employed, including alpha-pinene, beta-pinene, dipentene, d-limonene, l-limonene and terpinoline. These terpene hydrocarbons have boiling points ranging from about 150° to about 185° C. In another embodiment the terpene may contain three double bonds in monomeric form, including terpenes as allo-o-cymene, o-cymene, myrcene, etc. Other terpenic compounds include alpha-terpinene, p-cymene, etc. Also included as terpenic compounds are rosins comprising the terpenic hydrocarbons and/or terpenic acids. These rosins and acids generally are tricyclic compounds. However, they are obtained from pine trees and therefore may be included in the broad classification as terpene or terpenic compounds.

As hereinbefore set forth, the terpene is reacted with an alpha,beta-unsaturated polycarboxylic acid, anhydride or ester thereof. Any unsaturated polycarboxylic acid having a point of unsaturation between the alpha and beta carbon atoms may be employed. Illustrative unsaturated dicarboxylic acids including maleic acid, fumaric acid, citraconic acid, mesaconic acid, aconitic acid, itaconic acid, etc. While the dicarboxylic acids are preferred, it is understood that alpha,beta-unsaturated polycarboxylic acids containing three, four or more carboxylic acid groups may be employed. Furthermore, it is understood that a mixture of alpha,beta-unsaturated polycarboxylic acids and particularly of alpha,beta-unsaturated dicarboxylic acids may be used.

While the alpha,beta-unsaturated polycarboxylic acid may be employed, advantages appear to be obtained in some cases when using the anhydrides thereof. Illustrative anhydrides include maleic anhydride, citraconic anhydride, aconitic anhydride, itaconic anhydride, etc. It is understood that a mixture of anhydrides may be employed and also that the anhydride may contain substituents and particularly hydrocarbon groups attached thereto. Furthermore, it is understood that the various anhydrides are not necessarily equivalent. Also, it is understood that esters of the alpha,beta-unsaturated polycarboxylic acids may be employed, the ester group being selected from alkyl, alkaryl, aralkyl, aryl and cycloalkyl substituents replacing one or more of the hydrogen atoms of the carboxylic acid groups.

The reaction of terpene and alpha,beta-unsaturated acid, anhydride or ester generally is effected at a temperature of from about 150° to about 300° C., and preferably of from about 160° to about 200° C. The time of heating will depend upon the particular reactants and may range from 2 hours to 24 hours or more. When desired, a suitable solvent may be utilized. Following the reaction, impurities or unreacted materials may be removed by vacuum distillation or otherwise, to leave a resinous product which may be a viscous liquid or a solid.

A terpene-maleic anhydride reaction product is available commercially under the trade name of "Petrex Acid." This acid is a stringy, yellow-amber colored mass and is mostly dibasic. It has an acid number of approximately 530, a molecular weight of approximately 215 and a softening point of 40°–50° C.

Another reaction product is available commercially under the trade name of "Lewisol 40 Acid." This is a tricarboxylic acid and is formed by the reaction of fumaric acid and rosin. It is a hard, brittle solid having a softening point of 150°–160° C. and a specific gravity at 25°/25° C. of 1.178.

The condensation of the dialkanolamine and reaction product of terpene and alpha,beta-unsaturated polycarboxylic acid, anhydride or ester may be effected in any suitable manner. The reaction generally is effected at a temperature above about 80° C. and preferably at a higher temperature which usually will not exceed about 200° C., although higher or lower temperatures may be employed under certain conditions. The exact temperature will depend upon whether a solvent is used and, when employed, on the particular solvent. For example, with benzene as the solvent, the temperature will be in the order of 80° C., with toluene the temperature will be in the order of 120° C., and with xylene in the order of 150°–155° C. Other preferred solvents include cumene, naphtha, decalin, etc. Any suitable amount of the solvent may be employed but preferably should not comprise a large excess because this will tend to lower the reaction temperature and slow the reaction. Water formed during the reaction may be removed in any suitable manner including, for example, by operating under reduced pressure, by removing an azeotrope of water-solvent, by distilling the reaction product at an elevated temperature, etc. A higher temperature may be utilized in effecting the reaction in order to remove the water as it is being formed. However, for many uses, the reaction need not go to completion, but in any event at least a substanial portion of the reaction product will comprise that formed by the condensation of the polyalkanolamine with the terpene-acid, anhydride or ester reaction product.

In general, the condensation is effected using equivalent acid or potential acid groups per total hydroxyl groups. However, it is understood that the total acid or potential acid groups may range from about 0.5 to about 2 equivalents thereof per equivalent of total hydroxyl groups.

From the above description, it will be noted that a number of different compounds may be prepared and used in accordance with the present invention, and will depend upon specific dialkanolamine and terpene-acid, anhydride or ester reaction product used in the condensation reaction. However, it is understood that, while all of these compounds will be effective in certain substrates, all are not necessarily equivalent in the same or different substrate.

The condensation product is recovered as a viscous liquid or solid. In some cases, the product will be marketed and utilized as a solution in a solvent. Conveniently, this solvent comprises the same solvent used in preparing the condensation product and is recovered in admixture with at least a portion of the solvent, thereby avoiding the necessity of removing all of the solvent and subsequently adding it back. When a more dilute solution is desired than is recovered in the manner hereinbefore set forth, it is understood that the same or different solvent may be commingled with the mixture to form a solution of the desired concentration.

The concentration of additive to be used in the organic substrate will depend upon the particular substrate and the particular benefits desired. In general, the additive will be used in a concentration of from about 0.00001% to about 5% by weight or more and more specifically is used in a concentration of from about 0.0001% to about 1% by weight of the substrate. The additive may be used along with other additives which are incorporated in a substrate for specific purposes including, for example, metal deactivators, antioxidants, antiozidants, synergists, dyes, fuel improvers, etc.

The additive is incorporated in the substrate in any suitable manner. As hereinbefore set forth, the additive conveniently is marketed as a solution in a suitable solvent, including hydrocarbons and particularly aromatic hydrocarbons as benzene, toluene, xylene, cumene, etc. When the additive is to be incorporated in a liquid substrate, it is added thereto in the desired amount and the resultant mixture suitably agitated or otherwise mixed in order to obtain intimate admixing of the additive in the substrate. When the additive is to be utilized as a corrosion inhibitor in plant equipment, it may be introduced into a fractionator, vapor line or at any other suitable point in order to prevent corrosion of the plant equipment. In this embodiment, the additive carries over into the product of the process and also serves therein as a beneficent. It is understood that a portion of the additive may be introduced into the plant equipment and an additional portion of the additive incorporated in the effluent product when so desired.

The following examples are introduced to illustrate further the novelty and utility of the present invention but not with the intention of unduly limiting the same.

A number of additives were prepared and were tested by two different methods. In one method, referred to as the "Fuel Oil Suspension Test," powdered carbon black (about 1½ cc.) is shaken with 100 cc. of fuel oil for 2 minutes. At a period up to a week, a settling slowly occurs. An effective additive retards the settling and maintains the sediment dispersed throughout the oil. As hereinbefore set forth, dispersing the sediment throughout the fuel oil allows the sediment to pass through filters, burner tips, etc., whereas sedimentation will result in clogging of the fuel oil lines, filters, burner tips, etc.

In still another test, referred to as the "Erdco Test," heated oil is passed through a filter and the time required to develop a differential pressure across the filter of 25 in. Hg is determined. It is apparent that the longer the time, the more effective is the additive. However, with a very effective additive, the time to reach a differential pressure across the filter of 25 in. Hg is lengthened beyond reasonable limits that the test is stopped after about 250 minutes and the differential pressure at that time is reported.

Example I

The additive used in this example was prepared by the condensation of 1 equivalent of N-tallow-diethanolamine (Ethomeen T/12) with 1 equivalent of Petrex Acid. As hereinbefore set forth, N-tallow-diethanolamine is a mixed N-aliphatic-diethanolamine containing from 12 to 20 carbon atoms in the alkyl group and mostly 16 to 18 carbon atoms. Also, as hereinbefore set forth, Petrex Acid is the reaction product of terpene and maleic anhydride, and the properties of this acid have been set forth previously. The condensation was effected in substantially the same manner as hereinbefore described. Xylene was used as the solvent and the mixture was refluxed at 155°–165° C. for 8 hours. When no more water was evolved, the solvent was removed by pumping in vacuo, ending with a temperature of 100° C. at 1 mm. pressure.

The above condensation product was prepared as a solution in toluene and 0.02% by weight (based on active ingredient) was incorporated in 100 cc. of a #2 fuel oil and tested according to the "Fuel Oil Suspension Test" heretofore described. When evaluated according to this test, the fuel oil containing this additive was reported as good. In contrast, a control sample of the fuel oil (sample not containing this additive), when evaluated in this test, was reported as poor. As hereinbefore set forth, the results reported as "good" means that the carbon black was maintained in suspension and did not settle out. On the other hand, the results reported as "poor" mean that the carbon black settled out of solution and therefore would plug filters, burner tips, etc., during use.

Example II

Another sample of the condensation product prepared in the manner described in Example I was utilized in the "Erdco Test." The heated oil used in this test was a commercial range oil. 0.01% by weight of the condensation product described in Example I was incorporated in a sample of the oil and run in the "Erdco Test." After 300 minutes, the differential pressure across the filter was only 0.2 in. Hg. On the other hand, a control sample (not containing this additive) reached a differential pressure across the filter of 25 in. Hg in about 78 minutes.

Example III

The additive used in this example was prepared by the condensation of 1 equivalent of N-coco-diethanolamine (Ethomeen C/12) with 1 equivalent of Petrex Acid. As hereinbefore set forth, N-coco-diethanolamine contains mostly 12 carbon atoms per group in the alkyl substituent. The condensation was effected in substantially the same manner as described in Example I.

0.02% by weight of this condensation product was incorporated in another sample of another fuel oil and tested in the "Fuel Oil Suspension Test" heretofore described. When evaluated according to this test, the fuel oil containing this additive was reported as good. As hereinbefore set forth, this means that the carbon black was maintained in suspension and did not settle out. On the other hand, a control sample without this additive was reported as "poor," which means that the carbon black settled out of solution and therefore would plug filters, burner tips, etc. during use.

Example IV

The additive used in this example was prepared by the condensation of 1 equivalent of N-stearyl-diethanolamine with 1 equivalent of Petrex Acid. This condensation was effected in substantially the same manner as hereinbefore described.

0.02% by weight of this condensation product was incorporated in a #2 fuel oil and tested according to the "Fuel Oil Suspension Test." The results of this test were reported as good. Here again, it will be noted that the additive served to improve the fuel oil.

Example V

The additive used in this example was prepared by the condensation of 1 equivalent of N-soya-diethanolamine (Ethomeen S/12) with 1 equivalent of Petrex Acid. As hereinbefore set forth, N-soya-diethanolamine contains from 16 to 18 carbon atoms in the alkyl substituent.

0.02% by weight of this condensation product was incorporated in a #2 fuel oil and tested according to the "Fuel Oil Suspension Test." The results of this test were reported as good, which means that the additive served to improve the fuel oil and will prevent clogging of the filters, burner tips, etc. during use.

Example VI

The additive used in this example is prepared by the condensation of 1 equivalent of N-hexadecyl-diethanolamine with 1 equivalent of Lewisol 40 Acid. The properties of this acid have been set forth hereinbefore. The condensation is effected in substantially the same manner as hereinbefore set forth, using xylene as the solvent. Following completion of the reaction, the xylene is removed by vacuum distillation, and the condensation product is prepared as a solution in toluene.

0.02% by weight of the condensation product prepared in the above manner is tested in the "Fuel Oil Suspension Test" as hereinbefore described. Results reported as good mean that the additive serves to maintain the sediment in suspension and will not plug filters, burner tips, etc. during use of the fuel oil.

Example VII 42 g. of Petrex Acid, equal to 0.4 equivalent were reacted with 144 g. of Ethomeen T/12, equal to 0.8 equivalent in the presence of 100 g. of xylene. 4.7 cc. of water were condensed in a Dean-Stark water trap after 22 hours reflux time. The final product freed from xylene is a brown colored oil, with a basic mole combining weight of 532 and an acid number of 3.7.

0.0005% by weight of this product was incorporated in range oil and evaluated in the "Erdco Test." A differential pressure of 7.1 in. Hg after 300 minutes was developed in contrast to a pressure of 25 in. Hg in less than 100 hours, for a sample of the oil not containing the additive.

We claim as our invention:

1. The condensation product of an N-aliphatic hydrocarbon substituted dialkanolamine having from about 6 to about 50 carbon atoms in the aliphatic hydrocarbon substituent with the reaction product, formed at a temperature of from about 150° C. to about 300° C., of a terpene and a compound selected from the group consisting of maleic, fumaric, citraconic, mesaconic, aconitic and itaconic acids and their anhydrides and esters, said condensation product having been formed at a temperature of from about 80° C. to about 200° C. and with the use of from about 0.5 to about 2 equivalents of total acid and potential acid groups in said reaction product per equivalent of hydroxyl groups in the alkanolamine.

2. The condensation product formed by condensing at a temperature of from about 80° C. to about 200° C. one equivalent of an N-aliphatic hydrocarbon substituted dialkanolamine having from about 6 to about 50 carbon atoms in the aliphatic hydrocarbon substituent with one equivalent of the reaction product of a terpene and a compound selected from the group consisting of maleic, fumaric, citraconic, mesaconic, aconitic and itaconic acids and their anhydrides and esters, said reaction product having been formed at a temperature of from about 150° C. to about 300° C.

3. The condensation product formed by condensing at a temperature of from about 80° C. to about 200° C. one equivalent of an N-aliphatic hydrocarbon substituted dialkanolamine having from about 6 to about 50 carbon atoms in the aliphatic hydrocarbon substituent with one equivalent of the reaction product of a terpene and maleic anhydride, said reaction product having been formed at a temperature of from about 150° C. to about 300° C.

4. The condensation product formed by condensing at a temperature of from about 80° C. to about 200° C. one equivalent of an N-alkyl dialkanolamine having from about 15 to about 40 carbon atoms in the alkyl group with one equivalent of the reaction product of a terpene and maleic anhydride, said reaction product having been formed at a temperature of from about 150° C. to about 300° C.

5. The condensation product formed by condensing at a temperature of from about 80° C. to about 200° C. one equivalent of an N-alkyl dialkanolamine having from about 15 to about 40 carbon atoms in the alkyl group with one equivalent of the reaction product of rosin and fumaric acid, said reaction product having been formed at a temperature of from about 150° C. to about 300° C.

6. The condensation product of claim 1 further characterized in that said dialkanolamine contains from 2 to 6 carbon atoms in each of the alkanol groups and in that said terpene is a hydrocarbon of the formula $C_{10}H_{16}$.

7. The condensation product of claim 6 further characterized in that said dialkanolamine is a diethanolamine.

8. The condensation product of claim 2 further characterized in that said dialkanolamine contains from 2 to 6 carbon atoms in each of the alkanol groups and in that said terpene is a hydrocarbon of the formula $C_{10}H_{16}$.

9. The condensation product of claim 8 further characterized in that said dialkanolamine is a diethanolamine.

10. The condensation product of claim 4 further characterized in that said dialkanolamine is a diethanolamine and said terpene is a hydrocarbon of the formula $C_{10}H_{16}$.

11. The condensation product of claim 5 further characterized in that said dialkanolamine is a diethanolamine.

References Cited in the file of this patent

UNITED STATES PATENTS

| | | |
|---|---|---|
| 2,025,642 | Brubaker | Dec. 24, 1935 |
| 2,540,776 | Cadwell | Feb. 6, 1951 |
| 2,681,894 | Hoenel | June 22, 1954 |
| 2,907,734 | Greenlee | Oct. 6, 1959 |
| 2,909,496 | Cooke et al. | Oct. 20, 1959 |